United States Patent

[11] 3,544,067

[72] Inventors Austin E. Elmore
 8519 E. Passadena Ave., Scottsdale, 85251;
 Ernest A. Uhlmann, Phoenix, Arizona
 (4533 N. Scottsdale Rd., Scottsdale, Ariz. 85251)
[21] Appl. No. 814,553
[22] Filed April 9, 1969
[45] Patented Dec. 1, 1970

[54] FLOW CONTROL VALVE
 2 Claims, 3 Drawing Figs.
[52] U.S. Cl. .................................................. 251/344
[51] Int. Cl. .................................................. F16k 31/60
[50] Field of Search .................................... 251/344, 347, 349, 350, 353, 339, 341

[56] References Cited
 UNITED STATES PATENTS
 764,322  7/1904  Wiegand .................. 251/344
 1,899,506  2/1933  Hutt ........................ 251/353
 2,332,114  10/1943  Robb ....................... 251/344
 2,859,932  11/1958  Mackal .................... 251/349
 3,123,337  3/1964  Peras ...................... 251/347X
 3,277,922  10/1966  Eisel ....................... 251/344X
 FOREIGN PATENTS
 118,640  6/1944  Australia .................. 251/344
 303,772  2/1955  Switzerland .............. 251/347
 893,347  1/1944  France ..................... 251/349

Primary Examiner—Samuel Scott
Attorney—Williard L. Groene

ABSTRACT: A flow control valve particularly designed to control the water inflow during enema irrigation period, the valve being easily and accurately controlled by one hand actuation of the slide valve to regulate water inflow speed.

Patented Dec. 1, 1970 3,544,067

INVENTORS.
AUSTIN E. ELMORE -AND-
BY ERNEST A. UHLMANN.

Willard S. Green
ATTORNEY.

FLOW CONTROL VALVE

BACKGROUND OF THE INVENTION

1. Field of the Invention

This invention pertains to flow control valves, and is particularly directed enema water flow control valve.

2. Description of the Prior Art

Heretofore, rapid uncontrolled water during enema irrigation tended to cause intestinal pressure cramps and great discomfort for the patient. Difficulty was experienced because the valve could not be easily and accurately controlled by single hand actuation.

SUMMARY OF THE INVENTION

One of the objects of this invention is to provide a water flow control valve of high accuracy of setting and ease of control.

Still another object is to provide water control valve that can be actuated by single hand control.

A further object is to provide a single hand in line operated control valve for use in a suspended hose line readily accurately adjustable or shut off with a minimum of effort and skill being required of the operator.

DESCRIPTION OF THE PREFERRED EMBODIMENT

Figure 1:
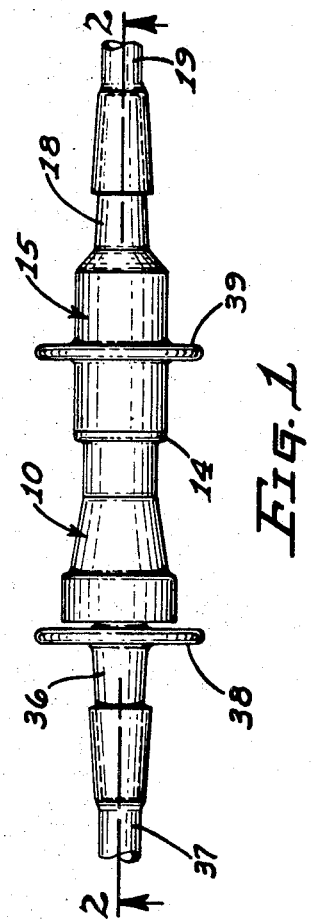
FIG. 1 is an outside view of the flow control valve incorporating the features of this invention.
Figure 3:
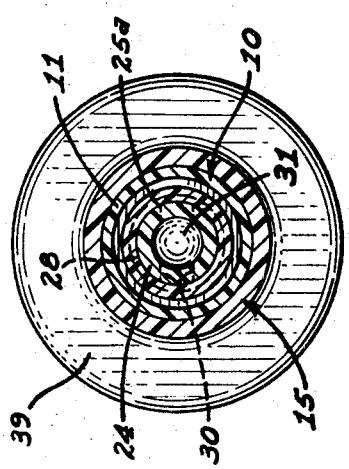
FIG. 3 is a sectional view on the line 3-3 of FIG. 2.

As an example of one embodiment of this invention, there is shown a flow control valve having a body 10 which is formed with an outside diameter portion 11 extending from one end 12 of the body to the radially disposed surface 13 of the integral flange 14 of the body 10. The valve seat member 15 has a bore 16 which closely fits and is adhesively sealed on the diameter portion 11 with its inner end 17 in sealed abutting engagement with the surface 13 of the flange 14. The other end of the valve seat member 15 has a tapered outside surface 18 to which may be secured a discharge hose line 19. A discharge passageway 20 communicates with the bore 21 of the hose 19.

A tapered valve seat bore 22 is formed in the valve seat member 15 and communicates between the discharge passageway 20 and the valve chamber 23 formed by the bore 16 and the conical surface 24a. The valve plunger 24 has a tapered stem 25 which fits into the tapered valve seat bore 22. The shank diameter portion 25a is secured into the bore 26 of the actuating stem 27 has suitable annular locking bead 28 engaging in the annular groove 29 formed in the bore 26. Radial elongated passageways 30 provide intercommunication between the chamber 23 and a passageway 31 formed within valve plunger 24, the passageway 31 communicating with the bore 26 in the actuating stem 27.

Figure 2:
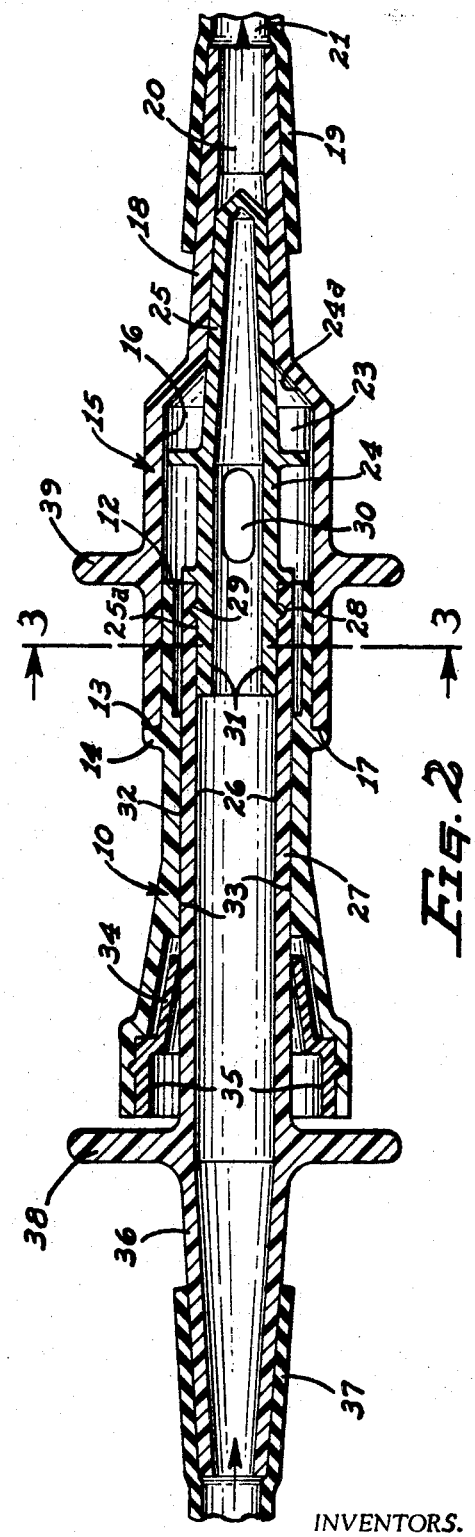
FIG. 2 is an enlarged sectional view on the line 2-2 of FIG. 1.

The outside diameter surface 32 of the actuating stem 27 is slidingly mounted in the bore 33 of the valve body 10 and extends outwardly through a truncated conical seal 34 secured in the enlarged bore 35 of the valve body 10. A tapered hose receiving end 36 accepts the supply hose 37 which communicates with the bore 26. A finger actuating flange 38 is formed integral with the actuating stem 27 and another finger actuating flange 39 is formed integral with the valve seat member 15 so that by moving with one hand the flanges 38 and 39 toward each other the position of the tapered valve stem 25 relative to the tapered valve seat bore 22 may be varied or closed off completely as shown in FIG. 2 to thereby control the flow between the supply hose 37 and the discharge hose 19.

We claim:

1. A flow control valve comprising in combination:
    A. a valve body;
    B. a valve seat member fixed on the valve body;
    C. a tapered outside surface on the valve seat member arranged to receive and secure a discharge hose line;
    D. a discharge passageway within the tapered outside surface of the valve seat member;
    E. a tapered valve seat bore in the valve seat member communicating between the discharge passageway and a valve chamber formed within the valve seat member adjacent its connection with the valve body;
    F. a valve plunger having a tapered valve stem fitting into the tapered valve seat bore;
    G. an actuating stem axially movable in the valve body and connected to the valve plunger;
    H. a longitudinally extending passageway in the valve plunger;
    I. radially elongated passageways in the valve plunger intercommunicating between the valve chamber and the longitudinally extending passageway in the valve body;
    J. a longitudinally extending bore in the actuating stem communicating with the longitudinally extending passageway in the valve plunger; and
    K. and a hose receiving and securing end on the actuating stem for an input supply hose to connect it with the longitudinally extending bore in the actuating stem.

2. A flow control valve as in claim 1 wherein a finger actuating flange is formed on the actuating stem and a second finger actuating flange is formed on the valve seat member so that by moving with one hand the flanges toward each other the position of the tapered valve stem to the tapered valve seat bore may be varied or closed off to thereby control the flow between the supply hose and the discharge hose.